Jan. 4, 1966     C. M. SWEET     3,227,197
COMBINING CUTTING AND BENDING IN SAWING WOOD
Filed March 5, 1962     5 Sheets-Sheet 1

INVENTOR.
Corliss M. Sweet

Jan. 4, 1966 C. M. SWEET 3,227,197
COMBINING CUTTING AND BENDING IN SAWING WOOD
Filed March 5, 1962 5 Sheets-Sheet 2
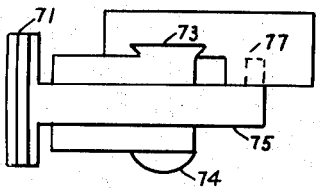
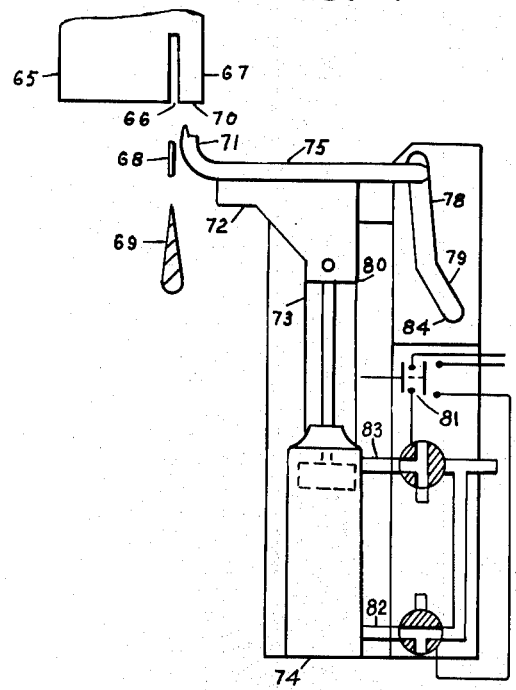
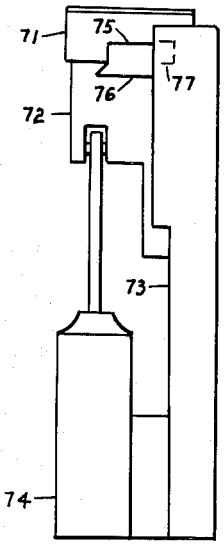
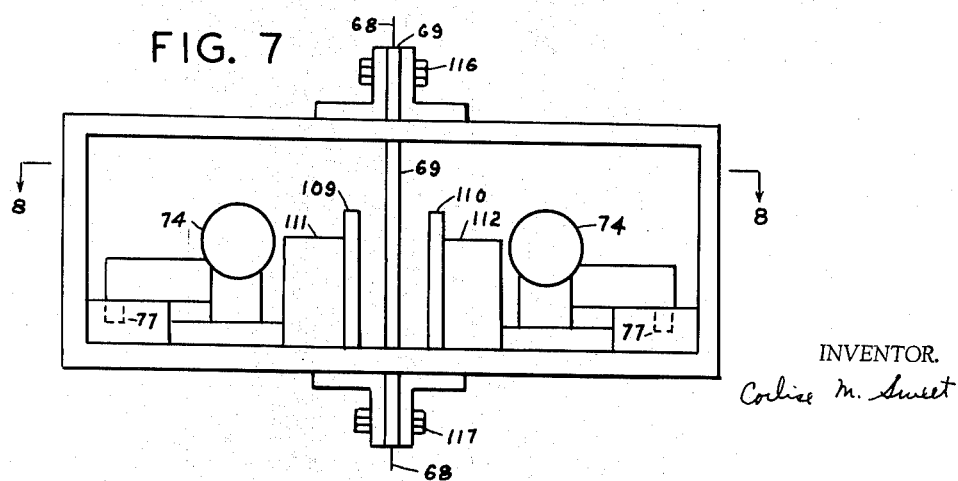
INVENTOR.
Corliss M. Sweet Jan. 4, 1966  C. M. SWEET  3,227,197
COMBINING CUTTING AND BENDING IN SAWING WOOD
Filed March 5, 1962  5 Sheets-Sheet 3
FIG. 8
FIG. 9
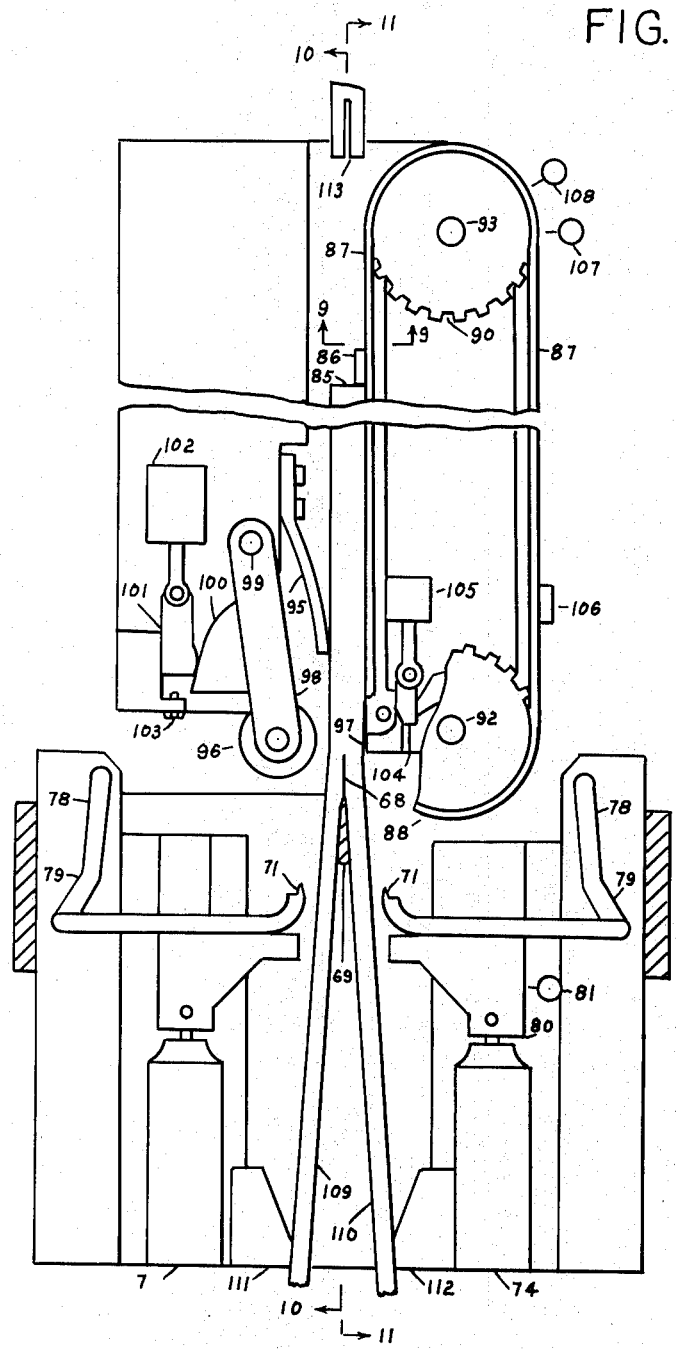
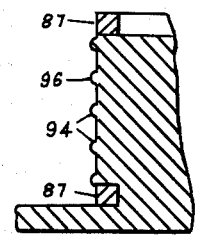
FIG. 12
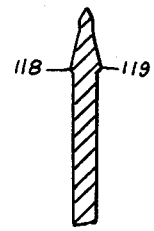
FIG. 13
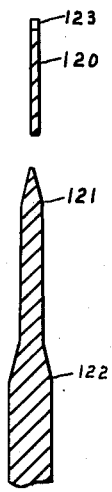
INVENTOR.
Corliss M. Sweet Jan. 4, 1966    C. M. SWEET    3,227,197
COMBINING CUTTING AND BENDING IN SAWING WOOD
Filed March 5, 1962                                5 Sheets-Sheet 4

INVENTOR.
Corliss M. Sweet

Jan. 4, 1966  C. M. SWEET  3,227,197
COMBINING CUTTING AND BENDING IN SAWING WOOD
Filed March 5, 1962  5 Sheets-Sheet 5

INVENTOR.
Corliss M. Sweet

United States Patent Office 3,227,197
Patented Jan. 4, 1966

3,227,197
COMBINING CUTTING AND BENDING IN SAWING WOOD
Corlise M. Sweet, 1000 E. Montana St., Milwaukee, Wis.
Filed Mar. 5, 1962, Ser. No. 177,610
9 Claims. (Cl. 144—312)

This invention relates to cutting boards from timbers by combining cutting and bending. In Patent 3,089,524 issued May 14, 1963, a new method of reducing saw dust waste was described in which the board is bent to provide clearance for the saw. This invention shows further methods by which bending can be used to cut boards more efficiently.

In sawing boards from timbers the conventional method is to use band saws or circular saws that have large teeth. The large teeth are necessary because timers from which boards are cut are thick and wood increases in volume when changed to saw dust. The cutting edges of the large teeth are approximately twice the thickness of the blade. One of the reasons for the wide cutting edges is to provide sufficient space on the sides of the blade for saw dust that spills out of the saw gullets. If sufficient space is not provided the saw dust on the sides of the blade causes friction which increases power consumption and heats the blade. By bending the board away from the blade, as will be described below, clearance is provided for the blade and the cutting edge of the teeth can be made narrower. Making the teeth smaller the teeth will not project as high above the blade and therefore they can not be bent as easily in the sawing operation. The teeth being smaller the blade can be thinner. A thinner blade still further reduces the thickness of the kerf and reduces saw dust waste.

A thinner blade can flex more than a thicker blade and for that reason it can be used on a band mill that has smaller diameter wheels. A band saw that cuts a thinner kerf does not have to transmit as much power and can use narrower blades. A band mill that has smaller wheels and uses narrower blades is much smaller than the conventional band mill and can be more easily moved from one sawing location to another. Other advantages of the small band mill are that it costs less and it does not require the skilled man to maintain the wide band saw blade. The above will be an advantage to the small saw mill operator who now uses circular saws that cut a 5/16 inch thick kerf.

In addition to the above advantages the following are the objects of this invention.

It is the intention to show that by cutting a short kerf in the end of the timber, prior to the final sawing operation, that a smaller tooth can be used in combination with a wedge to reduce saw dust waste in cutting a board from a timber.

A further object is to show that by compressing the trailing end of the timber there will be less tendency for the end of the board to split when the trailing side of the timber approaches the saw.

Another object is to show that by compressing some types of timbers at the point where they are being cut that it is possible to bend the cut board farther from the cutting blade and thereby cut a thinner kerf.

A still further object is to show that by placing small bearing surfaces on the wedge the ridges on the cut surface caused by the teeth can be slightly compressed thereby making the board smoother.

Another object is to show that by placing a larger taper on the back section of the wedge that less force will be required to push the timber past the wedge.

A further object is to show that by cutting a short kerf in the end of the timber and bending the board away from the blade with a power operated tooth that a thinner kerf can be cut in the timber.

Another object is to show that by using a combination of the bending devices it is possible on some species of wood to cut a kerf that is thinner than the blade.

A further object is to show that by using a cam on the power operated tooth to bend the board away from the blade it will be simpler than the mechanism shown in Patent 3,089,524.

The accompanying drawings illustrate the mode of carrying out the invention.

FIGURE 4 is a schematic plan view of a timber, a band saw bladge, a wedge and a power operated tooth that is used to pull the board being cut away from the blade.

FIGURE 5 is a schematic end view of the power operated tooth in FIGURE 4, looking at FIGURE 4 from the top side.

FIGURE 6 is a schematic side elevation of the power operated tooth in FIGURE 4, looking at FIGURE 4 from the right side.

FIGURE 7 is a schematic end view of a mechanism for cutting a thick board into two thinner boards by the bending process.

FIGURE 8 is a schematic section view through section 8—8 in FIGURE 7 showing a mechanism that is conveying a thick board past a saw and a wedge, two power operated teeth similar to the power operated teeth shown in FIGURE 4, and a roller that compresses the section of the board being cut.

FIGURE 9 is a schematic section view through section 9—9 in FIGURE 8 showing a surface having ridges on it against which the board being sawn is located and the chains that are attached to the conveyor flight that conveys the board past the saw.

FIGURE 12, sheet 3, is a schematic section view of a wedge that has small bearing surfaces on both sides of the wedge that compress the ridges on the board and make the board smoother.

FIGURE 13 is a schematic section view of a brand saw blade and a wedge having a small taper on the front of the wedge and a larger taper on the back of the wedge that reduces the force required to push the board past the wedge.

Figure 14:
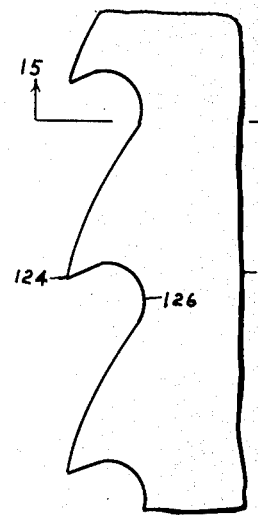

FIGURE 14, sheet 5, is a side elevation of the tooth edge of a conventional wood saw.

Figure 15:
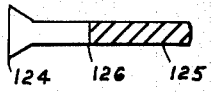

FIGURE 15 is a cross section through section 15—15 in FIGURE 14 showing how the cutting edge is approximately one hundred percent thicker than the blade.

Figure 16:
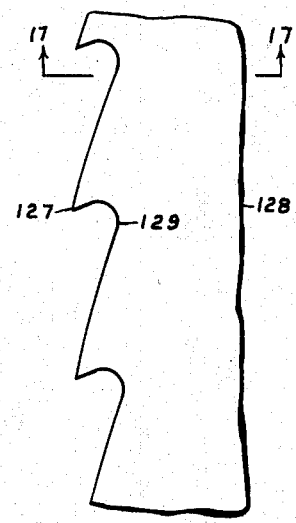

FIGURE 16 is a schematic side elevation of the tooth edge of a blade that is used with the bending apparatus to reduce the thickness of the kerf, showing how the gullets have been made smaller and the teeth spaced closer together than the conventional blade in FIGURE 14.

Figure 17:
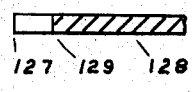

FIGURE 17 is a schematic section view through section 17—17 in FIGURE 16 showing how the cutting edge is substantially the same thickness as the blade and how by reducing the size of the gullets the blade can be made thinner than the conventional blade in FIGURE 15.

Figure 18:
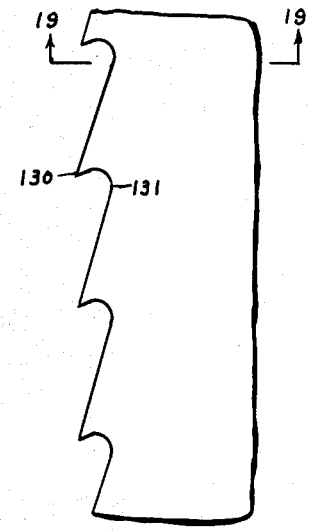

FIGURE 18 is a schematic side elevation showing that when a blade has a cutting edge thinner than the blade the gullets can be made smaller and the teeth spaced closer together than the blade shown in FIGURE 16.

Figure 19:
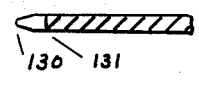

FIGURE 19 is a schematic cross section of the blade in FIGURE 18 taken through section 19—19 showing how the cutting edge has been made thinner than the blade thereby causing the blade to cut a thinner kerf than both the blades in FIGURES 15 and 17.

Figure 1:
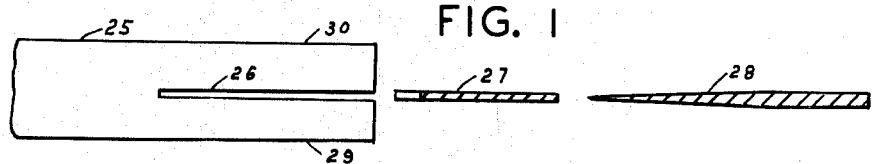
FIGURE 1 is a schematic plan view of a timber having a short kerf cut in the end, a blade in position to enter the kerf and a wedge behind the blade to bend the cut boards away from the blade.

FIGURE 1 shows a method of cutting two boards from a timber. Item 25 is a timber that has a short kerf 26 placed in one end. Item 27 is a saw blade that is ready to enter the kerf 26. Item 28 is a wedge that follows the saw blade and bends the boards 29 and 30 away from the blade 27.

The short kerf 26 is made in the timber by a very thin band saw or reciprocating saw that is not shown. The saw that cuts kerf 26 only has to saw a short distance in comparison with the saw 27 that has to cut the full length of the board. Therefore the teeth in the saw that cuts the kerf 26 can be comparatively small, the blade thin and the kerf it cuts can also be thin.

It is preferred that the blade 27 be slightly thinner than the kerf 26 but it could be larger than the kerf 26. The blade 27 being slightly smaller than the kerf 26 it will cut very little saw dust. This will eliminate trouble from saw dust spilling out of the saw gullets and lying between the blade and the kerf. If trouble is experienced with saw dust on the sides of the blade, a blade with holes in it similar to that shown in application Serial Number 169,368 filed January 29, 1962 can be used.

After the blade 27 has completely entered the kerf 26 the wedge 28 will enter the kerf 26 and bend the boards 29 and 30 away from the sides of the blade 27. The bending of the boards will provide clearance for the blade 27 to move in the kerf.

The above method reduces the thickness of the final kerf in two ways. First, the thickness of the kerf is reduced because the saw cutting edges do not have to cut clearance for the blade. This allows the saw cutting edges to be made narrower. Secondly, the saw cutting edges being narrower the saw does not cut as much saw dust and the saw gullets can be greatly reduced in size. A saw with smaller gullets can have a thinner blade. A thinner saw will cut a thinner kerf.

It should further be noted that some thin boards that can be bent considerable can be cut with a blade that cuts a kerf thinner than the blade. This can be accomplished by bending the board away from the blade and grinding the cutting edges on the saw so that they are thinner than the blade. A saw with cutting edges thinner than the blade is shown in FIGURE 19.

Cutting a thinner kerf and cutting wood fibers that are under a tension load from bending reduces the cutting strain on the blade. This reduced strain on the blade allows using a thinner and narrower blade.

Figure 2:
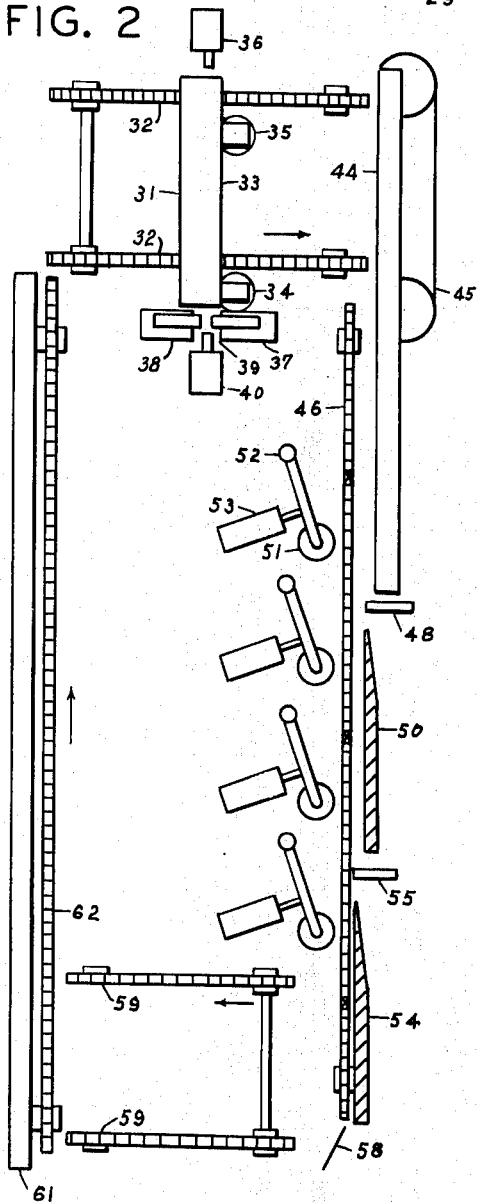
FIGURE 2 is a schematic plan view showing one timber in the starting position and the arrangement of equipment that could be used to place two short kerfs in the end of a timber, convey the timber to two band saws and their accompanying wedges that are shown cross hatched, and return the timbers to the starting point.
Figure 3:
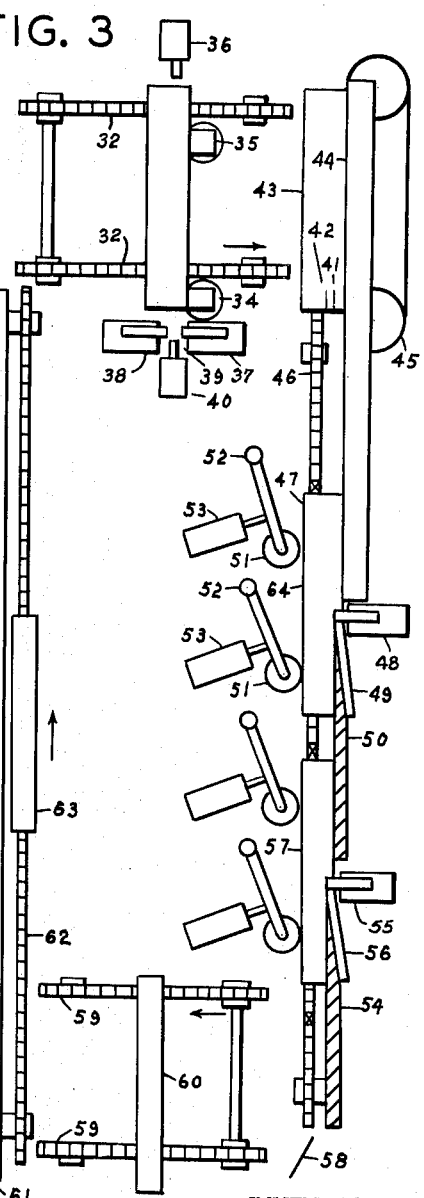
FIGURE 3 is similar to FIGURE 2 with the exception that timbers in various stages of being cut have been placed on the drawing.
Figure 10:
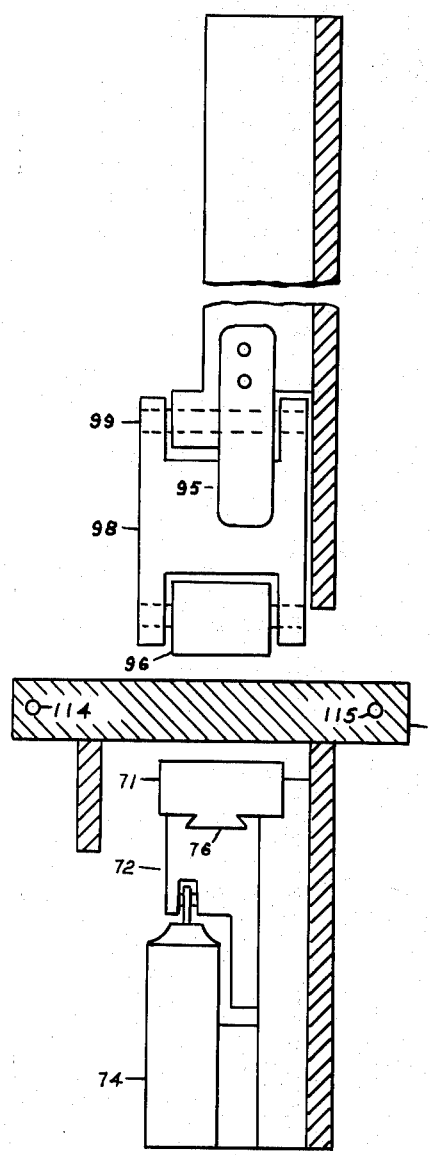
FIGURE 10 is a schematic section view through section 10—10 in FIGURE 8 showing the flat spring that holds the board in position for sawing, the roller that compresses the board being cut, the wedge, and the power operated tooth that bends the board, that has been cut, away from the blade.
Figure 11:
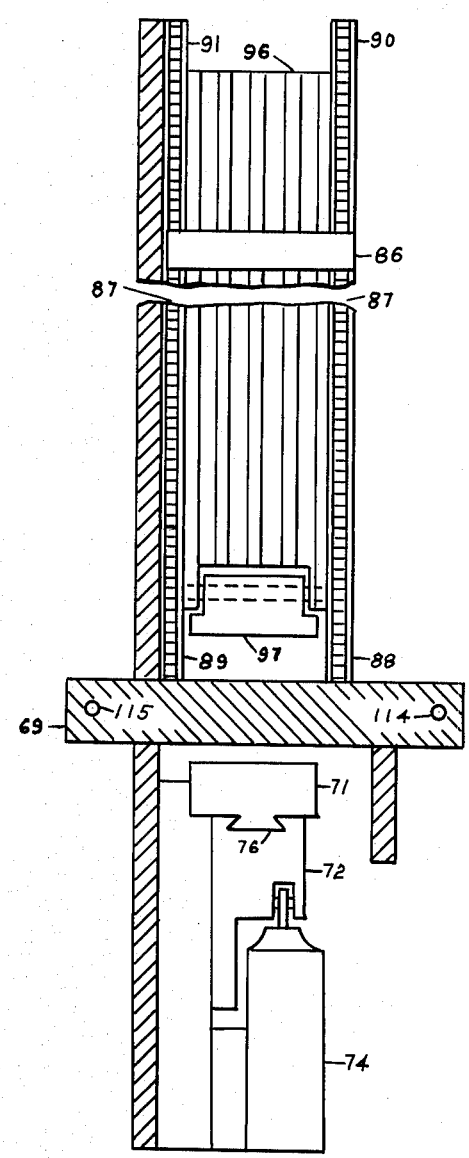
FIGURE 11 is a schematic section view through section 11—11 in FIGURE 8 showing the conveying mechanism that moves the board past the blade, the hinged part that is used to compress the board when it is being cut, the wedge, and a power operated tooth.

FIGURES 2 and 3 show how this method of cutting could be accomplished. The timber 31 moves down the conveyor 32 as shown by the arrow. The surface 33 on the timber 31 is stopped by the stops 34 and 35. The stops can be raised above the conveyor 32 by air cylinders that have remote controls. Air cylinder 36, which is remote controlled, pushes the timber 31 toward the band mills 37 and 38 until the timber is stopped by the piston rod end 39 on the air cylinder 40. The band mills 37 and 38 place short kerfs 41 and 42 in the end of the timber which are shown in timber 43. Air cylinder 40, which is remote controlled, then pushes the timber 31 away from the band saws 37 and 38. The stops 34 and 35 are lowered by remote control and the timber moves down the conveyor 32 to the stop 44. The conveyor 45 moves the timber onto conveyor 46. Conveyor 46 moves timber 47 to band mill 48. The band saw on band mill 48 enters the short kerf 41 and cuts board 49. Board 49 is bent away from the blade on band mill 48 by wedge 50. Rollers 51 pivot about axis 52. Air cylinders 53, that are remote controlled, hold rollers 51 against the timbers. The timbers are held against the stop 44, the wedge 50, and the wedge 54. Band mill 55 cuts board 56 from timber 57. The wedge 54 bends the board 56 away from the blade on band mill 55. The timber travels to guide 58 and is pushed off conveyor 46 and onto conveyor 59. Timber 60 is shown on conveyor 59. The timber 60 moves to stop 61, and is conveyed to the starting point by conveyor 62. Timber 63 is shown on the conveyor 62. Similar operations as described above can be performed on timber 63.

In the above it will be noted that the stops 34 and 35 hold the timber on the same side as the stop 44. This is done so the saws on the band mills 48 and 55 will be positioned correctly to enter the short kerfs 41 and 42.

On some wood cutting operations it may be desired to cut all the short kerfs in the timber at one time. When this is done the band saws 37 and 38 would be replaced by a reciprocating gang saw. When all the short kerfs are cut in the timber at one time the position of the band saws should be changed so that the saws cut on the opposite sides of the timber. That is the first board to be cut would be cut from the timber surface 64. This would allow the timber surface 33 to act as the location surface for cutting all the boards. In this way if there is an error in cutting one of the boards the location position for cutting the balance of the boards would not be changed.

FIGURE 3 shows the band mills arranged for making vertical cuts. On slabs, half logs, and some timbers that are wider than they are thick it would be an advantage if the saws were arranged to make horizontal cuts. This could be done using the same principles as described above. The main difference would be that the band saws be arranged to cut horizontal, the wedges would be horizontal, and the rollers to compress the timber being sawn would push vertically down instead of horizontally.

FIGURES 4, 5 and 6 shows a power operated tooth that could be incorporated into the mechanism shown in FIGURES 2 and 3. Item 65 is a timber, ready to be sawn, that has a short kerf 66 that partly separates a board 67 from the timber. The band mill blade 68 is driven by a band mill not shown. The band mill can be a standard band mill or it can be a band mill similar to that shown in application Serial Number 70,474 filed November 21, 1960. Behind the blade 68 is a wedge 69 that is used to bend the board away from the blade. The wedge performs the same function as the wedges 50 and 54 shown in FIGURE 3. As the timber advances toward the saw the end of the board 70, that is to be cut from the timber, comes in contact with the tooth 71. The tooth 71 is mounted on two slides that are approximately 90 degrees to each other. Slide 72 moves approximately parallel with the side of blade 68 and slides in the dovetail groove 73. Air cylinder 74 moves slide 72 along the dovetail groove 73. The tooth 71 is located on a slide 75 that is approximately 90 degrees to the slide 72. Slide 75 moves in dovetail groove 76. The end of slide 75 has a cam follower 77 that is moved by a cam slot. The cam slot has two cam curves 78 and 79. Cam curve 78 is shaped to bend the board 67 away from the blade 68.

Cam curve 79 is shaped to move the tooth 71 out of the path of the board 67.

The operation of the power operated tooth is as follows. As the timber 65 is advanced toward the saw the end of the board 70 comes in contact with the tooth 71. Air pressure from air cylinder 74 causes the tooth 71 to be pushed into the end of the board 70. The end of the board 70 pushes the tooth in a direction parallel to the side of the saw blade 68. This causes the slide 72 to move along the dovetail groove 73 and the cam follower 77 moves along the cam 78. In this way cam 78 pulls the board 70 away from the blade 68. When the wedge 69 enters the kerf 66 and part 80 on the slide 72 comes to the electric switch 81 the electric switch reverses the direction of air in the cylinder 74. That is, an electric operated three way air valve allows air to escape from opening 82 at the back of air cylinder 74 and forces air into the opening 83 at the front of the cylinder. This causes the tooth 71 to move ahead of the end of the board 70. The cam follower 77 then moves to the position shown as 84. In this position the tooth 71 is out of the path of the advancing board 67. The tooth is shown in this position in FIGURE 8. After the timber 65 passes the saw 68 the air pressure is reversed in the air cylinder 74 and the tooth returns to the position shown in FIGURE 4. Returning the tooth to the position shown in FIGURE 4 can be by a hand controlled air valve or by an electric switch that is operated by the timber conveyor. This is explained further in the description of FIGURE 8.

The kerf 66 in addition to assisting in bending the board 67 away from the blade also acts as a guide to help steady the blade when the blade begins to cut the timber. This is important when cutting a thick section of wood with a thin blade.

In FIGURES 7, 8, 9, 10, and 11 a mechanism for cutting a thick board into two thinner boards is shown. A thick board 85 is being pushed by a conveyor lug 86. Conveyor lug 86 is moved by two chains 87 and chain sprockets 88, 89, 90, and 91. Sprocket 88 is fastened to sprocket 89 by shaft 92 and sprocket 90 is fastened to sprocket 91 by shaft 93. The sprockets are driven by a motor that is not shown. The board 85 is held against the surface 94 by a flat spring 95. The surface 94 is composed of small raised surfaces 96. The purpose of the small raised surfaces 96 is to provide space between the raised surfaces for small amounts of saw dust on the board.

The mechanism has a device for compressing the sides of the board. This will prevent the board from splitting when the trailing end of the board approaches the saw and it will allow the board to be bent a greater distance from the blade without splitting. It consists of a roller 96 that applies pressure to one side of the board and a pivoted plate 97 that holds the board from the opposite side. The roller 96 is held by a yoke 98 that is pivoted about a shaft 99. The yoke has a cam 100 that is moved by a wedge 101. Wedge 101 is moved by air cylinder 102. Screw 103 prevents the wedge from pushing the roll too far when the end of the board 85 passes under the roll 96. Pivoted plate 97 is made to pivot by a wedge roll 104 that is moved by air cylinder 105. This mechanism can be made to operate in different ways. For example if it is desired to have the board 85 compressed during most of the cutting cycle the cylinders 102 and 105 can be made to compress the board when part 80 arrives at electric switch 81. If it is desired that only the trailing end of the board 85 be compressed the cylinders 102 and 105 could be operated by conveyor lug 106 contacting electric switches 107 and 108. Conveyor lug 106 is spaced one-half the length of the conveyor chain 87 from conveyor lug 86. Therefore by adjusting electric switch 107 to the correct position conveyor lug 106 will operate the switch 107 at the time it is desired that timber 85 be compressed by roll 96 and pivoted plate 97. When conveyor lug 106 arrives at electric switch 108 the switch operates valves that cause the cylinders 102 and 105 to retract the wedges 101 and 104. The operation of the electric switches, valves, and air cylinders would be similar to that described in application Serial Number 70,493 filed November 21, 1961.

When the trailing end of the board 85 arrives at the saw the cut boards 109 and 110 are held on one side by the wedge 69 and on the opposite sides by parts 111 and 112. This arrangement holds the boards firmly and provides a good cutting condition. After the boards 109 and 110 are completely cut they are carried away by a conventional saw mill conveyor. The above mechanism for guiding the board being sawed is not the same as the mechanism to guide the boards in conventional resaws. In conventional resaws the guiding rolls only push on the wood sufficiently to hold the board in the correct position for sawing. The rolls in this device must exert sufficient pressure to hold the board in place for sawing and in addition it must exert sufficient force to prevent the board from splitting due to bending of the board away from the blade. The pressure required to prevent the board from splitting will depend on the specie of wood, the thickness of the wood, the width of the board and the amount the board is being bent. The combination of these forces to prevent the board from splitting is much greater than the force required to guide the board in conventional resaws.

The result is a new combination of forces make it possible to cut a thinner kerf. The combination of forces consists of one force that bends the board away from the blade and a counter balancing force that pushes on the guiding rolls to prevent the board from being split.

The mechanism shown in FIGURE 8 shows that it is intended to be used with boards having a short kerf 113 cut on the centerline previous to entering the machine. It should be noted that on some boards it would not be necessary to cut the short kerf 113 in the board. The power operated teeth and the wedge would be sufficient for some conditions.

The wedge 69 has holes 114 and 115 that allow it to be held in place by bolts 116 and 117. The wedge can be made in different shapes as shown in FIGURES 12 and 13. The wedge in FIGURE 12 has small bearing surfaces 118 and 119 that are shown greatly enlarged. The bearing surfaces being small they exert a large force in pounds per square inch on the wood surface that has been sawn. This large force compresses the ridges on the board surface that are made by the saw teeth and make the board smoother. The slope on the bearing surfaces 118 and 119 has to be small or the bearing surface will act like teeth and instead of compressing the wood they will break off slivers. On some wood a water coolant on the saw may help lubricate the bearing surfaces. Only two bearing surfaces are shown but more could be placed on the wedge if desired.

The wedge in FIGURE 13 is shown behind a blade 120. The wedge has a small taper 121 and a large taper 122. When the machine is operating the board will first be bent by the small taper 121 and when it arrives at the large taper 122 the board will be bent slightly more. This arrangement will reduce the force to bend the board away from the blade because the bending force is dependent on the distance of the incline from the blade. The distance of the incline for bending with the small taper is the distance from taper 121 to the saw cutting edge 123. The distance of the incline for bending with the large taper is the distance from taper 122 to saw cutting edge 123 which is approximately twice the distance from 121 to 123. Therefore the force required to bend the board with the large taper will be approximately half as much as for bending with the small taper and the force to push the board past the larger taper will be approximately half as much.

FIGURES 14, 15, 16, 17, 18, and 19 show how the conventional wood cutting saw can be reduced in size by using a bending mechanism.

FIGURES 14 and 15 show the tooth edge of a conventional saw that has a cutting edge 124 that is approximately one hundred percent thicker than the thickness of the blade 125. The bottom of the gullet 126 is deeper than the saws used with bending devices.

FIGURES 16 and 17 show a saw that can be used with a bending device to provide clearance for the blade. The cutting edge 127 is substantially the same thickness as the blade 128. The bottom of the gullet 129 is a smaller distance from the cutting edge 127 than the bottom of gullet 126 is from cutting edge 124 in FIGURE 14. The blade 128 is thinner than blade 125. The reason that blade 128 is thinner than blade 125 is that the gullet 129 is shallower than gullet 126. A tooth that has a shallower gullet cannot be bent sideways as easily as a tooth with a larger gullet therefore the blade on which it is cut can be thinner. Blade 128 being thinner than blade 125 it can flex more and be used on band mill wheels that are smaller in diameter. It can be understood from the above that because the cutting edge 127 is smaller than cutting edge 124 it will cut a much thinner kerf and thereby reduce the amount of lumber that is wasted in saw dust. It will further be understood that the teeth 127 being closer together than teeth 124 they can cut just as much saw dust as teeth 124 and at the same time cut a smaller chip per tooth. Teeth that cut a smaller chip usually cut a smoother surface. Boards that have a smoother surface, after being sawn, do not require as much wood to be removed from the surface to dress them smooth.

The blade in FIGURES 18 and 19 has a cutting edge 130 that is smaller than the thickness of the blade. The blade would be used in cutting thin boards that can be bent a sufficient distance to provide clearance for the blade. This blade cuts less saw dust than the blade shown in FIGURE 16 therefore the gullets 131 can be smaller than the gullets 129.

In addition to the information given above on the blades the holes shown in the blades in application Serial Number 169,368 filed January 29, 1962 and the forming teeth shown in application Serial Number 70,474 filed November 21, 1960 now Patent No. 3,129,735 could be added. The holes would carry away saw dust that spilled out of the gullets and the forming teeth would reduce the amount of saw dust that would have to be cut to provide space for the blade to pass through the wood.

The amount the saw kerf can be reduced in size by bending methods will depend on the sawing conditions, the species of the wood, the width and thickness of the board. It appears that when the bending method is used the cutting edges of the blade will vary from fifty percent thicker than the blade to less than the thickness of the blade. It was explained in Patent 3,089,524 that wood could be cut with a knife is properly bent. The largest reduction in saw dust waste will be obtained in changing from circular saws to band mills that have a bending device. There will also be a large saving in sawing some thin boards. The saw dust waste in sawing some thin boards is over thirty percent.

In conclusion the results that can be expected by using the bending method in cutting wood are as follows: saws or knives that cut less clearance or no clearance can be used, the clearance for the blade can be provided by bending the wood and compressing the kerf, there will be less saw dust waste, the sawn surface will be smoother, less power will be consumed in comparison with the power used by circular saws, smaller band mills than now used can replace circular saws that are very wasteful, and smaller less expensive saws can be used.

It is believed this development will benefit many people. At present there are 1.3 million homes built per year. It has been forecast that by 1970 two million homes will be built each year. It therefore seems that cutting wood by the method described will make a small saving for millions of people.

Various embodiments of the invention may be employed within the scope of the accompanying claims which particularly point out and distinctly set forth the subject matter regarded as the invention.

I claim:

1. The method of reducing saw dust waste in cutting a board from a timber, comprising cutting a board from a timber with a blade having a cutting edge that on the outermost edge is thinner than the thickness of the blade and is tapered to the thickness of the blade whereby when said blade is used with a device that bends the board away from the blade it cuts a kerf that is thinner than the blade, and bending the board that is being cut from the timber away from the blade with power operated means thereby providing clearance for the blade to pass through the wood.

2. The method of reducing saw dust waste in cutting a board from a timber, comprising cutting a short kerf in the end of a timber whereby a board is partly cut from said timber, conveying said timber by power operated means towards a power operated blade whereby said power operated blade enters said kerf, cutting said board from said timber with said blade that has teeth less than 50% thicker than the blade, and bending said board away from said blade with means provided for that purpose whereby clearance is provided for said blade to move in the kerf.

3. The method described in claim 2 in which the trailing end of the board is held under compression thereby reducing the amount that the trailing end of the board can be split from the timber by bending the board away from the blade.

4. The method described in claim 2 in which power operated teeth on both sides of the blade engage the end of the timber before the wedge enters the kerf, one of said power operated teeth pulls the wood being cut away from one side of the blade and the other power operated tooth pulls the wood away from the opposite side of the blade whereby the distance the short kerf is cut in the timber can be smaller in length and more clearance will be provided for the blade to move in the kerf.

5. A machine for cutting boards from timbers using the bending process, comprising a band mill, a power operated tooth, and a wedge; said band mill operating a blade for cutting the wood, said power operated tooth being mounted on two slides that are approximately ninety degrees to each other, one of said slides being approximately parallel to the side of the blade, the other said slide being approximately ninety degrees to the side of the blade, said slide that is parallel to the side of the blade being operated by an air cylinder that holds at least one tooth in the end of the board being cut from the timber, said slide that is at ninety degrees with the side of the blade being moved by a cam that pulls the tooth and the board away from the blade as the board is cut from the timber thereby providing clearance for the blade, and means for controlling said air cylinder to cause it to engage the timber at the proper time and disengage the timber after the wedge enters the kerf cut by the blade.

6. The method of cutting a kerf that is thinner than the blade when cutting a board from a timber, comprising conveying the timber with power operated means to a thin power operated blade, cutting a board from said timber with said blade having a cutting edge thinner than the blade, compressing the kerf slightly with the sides of the blade to provide part of the clearance for the blade to move in the kerf, and bending the board away from the blade with power operated means to provide additional clearance for the blade to move in the kerf whereby using the above method less saw dust is cut than in conventional sawing which provides clearance for the blade by cutting a kerf thicker than the blade.

7. The method of cutting a board from a timber which comprises, cutting a short kerf in the end of a timber whereby a board is partly cut from said timber, pushing at least one dogging type tooth against the end of the board being cut from said timber, exerting a pulling force on said tooth in a direction away from said kerf and in a direction approximately 90 degrees to the side of the kerf thereby bending the board being cut off and placing a stretching force on the convex side of the board being cut off, entering a blade having teeth substantially the thickness of said blade in said short kerf, cutting a kerf in those of said fibers that are being most stretched, inserting a wedge in the kerf back of the blade, disengaging the dogging type tooth from said board, and continue cutting the board from said timber with said blade and bending the board away from the blade with said wedge.

8. The method of cutting a thick board into two thinner boards, comprising cutting a short kerf in one end of a thick board on the approximate center line of said board whereby the thinner boards that are partly cut from said thick board can be bent farther from said center line by power operated teeth, transferring said thick board to a blade having a cutting edge less than 50% thicker than the thickness of the blade, bending said thinner boards away from the center line of said thick board with power operated teeth, continuing cutting the center line of said thick board with said blade, inserting a wedge into the kerf behind said blade, disengaging said power operated teeth from said thinner boards, and continuing simultaneous cutting the thick board with said blade and bending the thinner boards away from the blade with said wedge whereby using the above method it is possible to cut a thinner kerf.

9. The method of reducing saw dust waste in cutting a board from a timber, comprising cutting a short kerf in the end of a timber whereby a board is partly cut from said timber, conveying said timber by power operated means towards a power operated blade whereby said power operated blade enters said kerf, engaging the end of the board being cut from the timber with a power operated tooth, pulling said board away from said blade with said power operated tooth whereby additional clearance is provided for the blade to move in the kerf, cutting said board from said timber with said blade that has teeth less than 50% thicker than the thickness of the blade, inserting a wedge into the kerf behind said blade, disengaging said power operated tooth from the end of said board, and continuing simultaneous cutting said board from said timber and bending said board away from said blade.

References Cited by the Examiner

UNITED STATES PATENTS

| | | | |
|---|---|---|---|
| 68,203 | 8/1867 | Jewett | 144—312 |
| 77,439 | 5/1868 | Anderson | 143—140 |
| 259,661 | 6/1882 | Bowker. | |
| 341,989 | 5/1886 | Atkins | 143—133.1 |
| 485,970 | 11/1892 | McDonough | 143—5 |
| 782,088 | 2/1905 | Ward. | |
| 802,667 | 10/1905 | Stuart | 143—5 |
| 1,850,272 | 3/1932 | Shaw | 143—5 |
| 1,870,555 | 8/1932 | Burton. | |
| 2,356,324 | 8/1944 | Kendle et al. | 144—194 |
| 3,014,512 | 12/1961 | Moller | 144—321 |
| 3,089,524 | 5/1963 | Sweet | 144—312 |

FOREIGN PATENTS

| | | |
|---|---|---|
| 917,502 | 9/1924 | Germany. |
| 1,747 | 1/1891 | Great Britain. |

HAROLD D. WHITEHEAD, *Primary Examiner.*

EARL EMSHWILLER, *Examiner.*

WILLIAM W. DYER, JR., *Assistant Examiner.*